United States Patent [19]

Katz et al.

[11] Patent Number: 5,224,034

[45] Date of Patent: Jun. 29, 1993

[54] AUTOMATED SYSTEM FOR GENERATING PROCUREMENT LISTS

[75] Inventors: Paul A. Katz, Asbury Park; Amir A. Sadrian, Edison, both of N.J.

[73] Assignee: Bell Communications Research, Inc., Livingston, N.J.

[21] Appl. No.: 632,019

[22] Filed: Dec. 21, 1990

[51] Int. Cl.[5] .................. G06F 15/22; G06F 15/24
[52] U.S. Cl. .................. 364/401; 364/225; 364/918
[58] Field of Search ............ 364/401, 225, 918, 918.1

[56] References Cited

PUBLICATIONS

*Gruntworks 2.1A*, Marketools Inc., Sep., 1985.

*Primary Examiner*—Roy N. Envall, Jr.
*Assistant Examiner*—Laura Brutman
*Attorney, Agent, or Firm*—Leonard Charles Suchyta; John T. Peoples

[57] ABSTRACT

An automated system and concomitant methodology for minimizing the procurement costs of products and for generating a list of selected products based on the results of the minimization is disclosed for the Business Volume Discount regime. The system processing covers purchasing situations wherein multiple vendors offer a plurality of products and the vendors give discounts based on the total dollar amount of business received from the purchasers. The processing effected by the system utilizes a linear programming technique to solve a model of the business volume discount regime given a variety of constraints.

9 Claims, 3 Drawing Sheets

AUTOMATED SYSTEM FOR GENERATING PROCUREMENT LISTS

FIELD OF THE INVENTION

This invention relates generally to a computer-based product procurement system and, more particularly, to a system for automatically providing a purchasing manager with a report listing the type and number of products to be purchased from various vendors as well as an allocation of costs to the vendors supplying the products.

BACKGROUND OF THE INVENTION

Economic evaluation of products based on their price quotes and allocating their purchases to the least-cost vendor is a conventional problem in a product procurement regime. For purchasing tens and thousands of different products at different prices, this evaluation has been done on a one product-by-one product basis in the past, even for large companies with central purchasing departments. This strategy was employed because the vendors in the traditional situation provided discounts based solely on the quantity of each individual product purchased.

The cost structure for traditional manufacturing has been the main reason for this type of discount schedule. To manufacture any products, there is a fixed cost and a variable cost. Fixed cost does not change with the quantity manufactured. Fixed cost may be associated, for instance, with the cost of "tooling-up" to manufacture. On the other hand, variable cost is directly proportional to the quantity produced. Variable cost may be associated, for instance, with the cost of materials composing the item of manufacture. A large number of purchases of a single product will result in a lower fixed cost per article for the production of that article. This is the reason why the traditional manufacturing approach fostered the production of a high volume of standardized products, provided economies of scale in terms of quantity, and encouraged vendors to give quantity discounts.

Some of the factors in fixed cost, such as rent, are common among all of the products manufactured. What makes the fixed cost of one product different from that of another product in the same family is the set-up cost. With the introduction of Flexible Manufacturing System (an arrangement of machines and a connecting transport system under control of a central computer that allows processing of several workpieces simultaneously) into the production environment, the set-up cost becomes negligible in comparison to the variable cost. In other words, the economy of scale in terms of quantity essentially disappears, and as a result, it is more meaningful for vendors to give discounts based on the total dollar amount of multiple products sold to a given purchaser. This new approach gives rise to the *Business Volume Discount* regime, wherein multiple vendors offer multiple products at different unit prices, and discounts based on the total dollar volume of purchases.

The determination by a purchasing manager of the most economical purchasing option for required products, while considering such factors as prices, volume discounts and other financial incentives offered by many vendors for their products, has been virtually an intractable problem under the business volume discount regime. Ideally, the manager would determine the total cost of every possible purchasing scenario. But sheer numbers render this as practically impossible. For instance, a company might need 300 products that are available at different prices from only four vendors. Taking into account discounts and constraints such as limits on supplier capacity, the manager could be faced with sorting through an astronomical number of choices—as many as $10^{100}$.

Even the most capable purchasing manager would find it difficult to arrive at the best purchasing strategy because there are essentially an infinite number of choices to be addressed. However, purchasing decisions must be made and there is a significant amount of money at stake, especially for purchasers of high-cost, high-volume items. Decisions based on a sound economic analysis could save such purchasers a significant amount of money on an annual basis. Yet analyzing the options in a straightforward sense via a spread-sheet analysis or even computations on a powerful mainframe is time-consuming at best. There must be some limitation to the number of possibilities that can be considered to engender a more tractable problem and concomitant solution.

There is an additional complication to the purchasing dilemma. In the past, a buying company (hereafter simply referred to as a company) using a traditional purchasing approach generally bought products on an "as-ordered" basis, that is, the company purchased when the need arose. As incentives, suppliers offered discounts. For example, a vendor might sell one to 50 units for $100 each; 51 to 100 units for $98 each; and 101 or more units for $95 each. To formulate a purchasing strategy based on quantity discounts, a purchasing manager compared prices from different vendors one-by-one, product-by-product. The final purchasing strategy was a direct function of the comparisons. The traditional purchasing approach focused on comparisons between individual products rather than on the whole purchasing picture.

Under the more recent business volume discount approach, a vendor offers discounts on total business volume—a dollar value—as opposed to quantities of individual products. For example, a vendor might offer a 10 percent discount for a total business volume of two to four million dollars and a 20 percent discount for more than four million dollars' worth of purchases. In return, the company commits to a minimum volume of business, in accordance with anticipated demands. Thus the business volume discount regime results in generally a mix of both commitment and as-ordered purchasing decisions.

There are no known prior attempts to extend the methodology of the conventional purchasing approaches to cover the business volume discount purchasing problem.

SUMMARY OF THE INVENTION

These shortcomings and limitations of the prior art are obviated, in accordance with the present invention, by generating a report of selected products based on customer requirements via the determination of an optimal solution to the business volume discount model of the purchasing problem without calculating the actual cost of non-optimal solutions.

Broadly speaking, an automated method for generating a list of selected products to be purchased by a product manager under a business volume discount regime is implemented on a computer system. In operating the system, a set of input screen formats are called into view by the purchaser to enter and store information relating to: the product price and discount information provided by the vendors of the products; product demands; and constraints, if any, treating such factors as the maximum percentage of product demand to be purchased from any one vendor for a given product, the percentage of as-ordered purchases and commitment purchases, and so forth. Once this information is entered by the user, the business volume discount algorithm is invoked to determine the optimal purchasing strategy in view of the product price and discount data as well as the constraints, if any. The list of selected products as determined from invoking the algorithm is formatted by the computer system and displayed by the computer system to the purchaser.

The organization and operation of this invention will be better understood from a consideration of the detailed description of the illustrative embodiment thereof, which follows, when taken in conjunction with the accompanying drawing.

DETAILED DESCRIPTION

Figure 1:
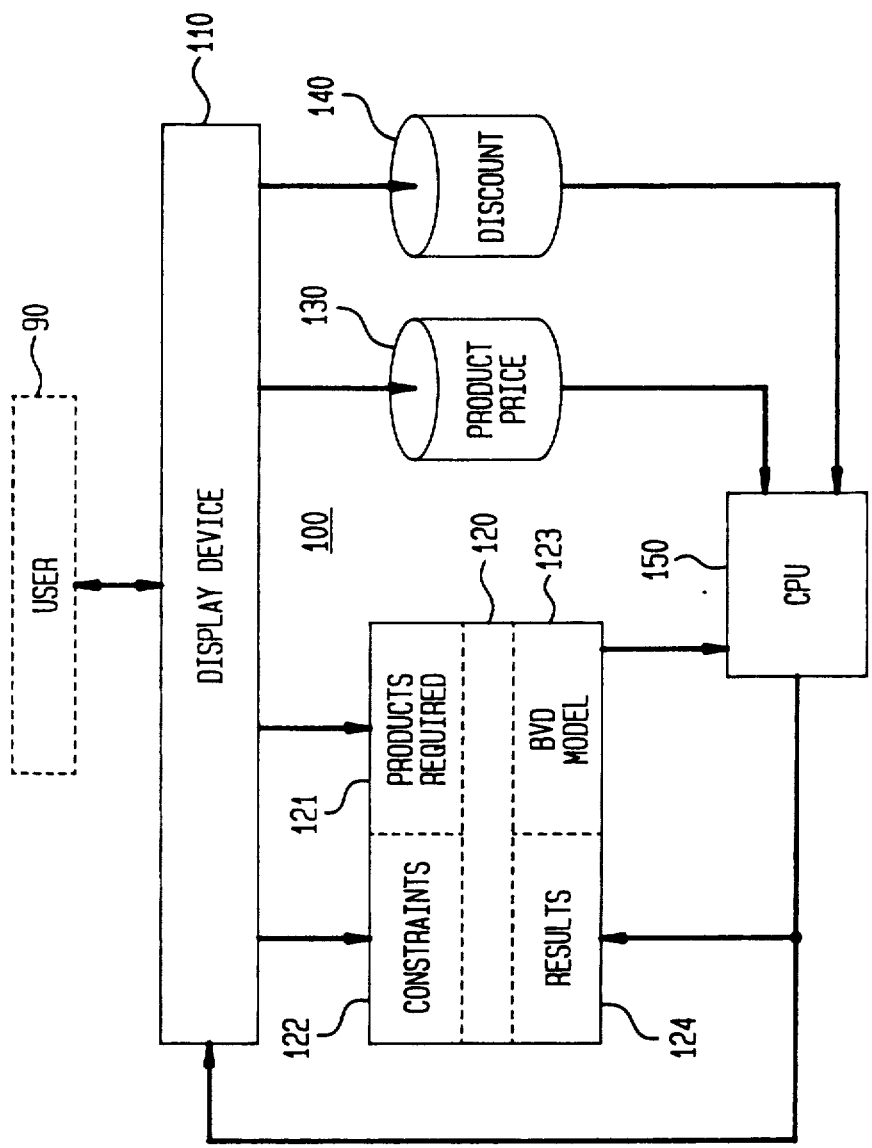
FIG. 1 is a high-level block diagram of a computer-based system for determining the optimal solution for the business volume discount regime and for generating a report of the selected products.

To place in perspective the detailed description of the present invention, it is instructive to first focus on a high-level discussion of the functionality of the computer-based automated system as well as the processing effected by the automated system and by the associated software modules comprising the automated system. After this, a description of the flow diagrams illustrative of the automated system will complete the detailed description. This approach has the advantage of first introducing terminology and notation which will aid in elucidating the various aspects of the present invention.

Overview of the Present Invention

As a starting point in the exposition, an example of the procurement of products by a company under a business volume discount regime is presented. There are three products of interest designated P1, P2, and P3, respectively. Forecasted demands/requirements for these products are given in TABLE 1.

TABLE 1

| PRODUCT | DEMAND |
|---------|--------|
| P1 | 500 |
| P2 | 375 |
| P3 | 313 |

The products are offered by three different vendors, designated V1, V2, and V3. Each vendor sells each product on a commitment and as-ordered basis. When a product is ordered on a *commitment* basis, the company makes an agreement with a vendor, in advance, to purchase a certain number of units of that product from that vendor. Once some quantity of a product has been purchased on a commitment basis, the discounted commitment price obtained also applies to all subsequent as-ordered purchases of that product. This type of as-ordered purchase is referred to as "locked-as-ordered" since the buyer locks the as-ordered price by buying so many items of the product on a commitment basis. The discount obtained from a vendor for as-ordered purchases applies only to those products purchased on an as-ordered basis but not on a commitment basis. This type of as-ordered purchase is referred to as "standard-as-ordered". When the product is purchased on a standard as-ordered basis, the company has no obligation to buy any particular quantity. The prices for each supplier-product combination are shown in TABLE 2.

TABLE 2

| Vendor | Product | Commitment Base Price ($) | Standard As-Ordered Base Price ($) |
|--------|---------|---------------------------|-------------------------------------|
| V1 | P1 | 110 | 110 |
|    | P2 | 120 | 120 |
|    | P3 | 180 | 200 |
| V2 | P1 | 100 | 105 |
|    | P2 | 120 | 120 |
|    | P3 | 200 | 210 |
| V3 | P1 | 90  | 100 |
|    | P2 | 130 | 130 |
|    | P3 | 190 | 210 |

In addition, each vendor gives a discount based upon the total dollar amount of business awarded to that vendor. An exemplary set of discount schedules for the three vendors is given in TABLE 3.

TABLE 3

| Vendor | Commitment Range ($) | Discount (%) | Standard As-Ordered Range ($) | Discount (%) |
|--------|----------------------|--------------|-------------------------------|---------------|
| V1 | 0–5,000 | 0 | 0–20,000 | 0 |
|    | 5,000–50,000 | 2 | over 20,000 | 2 |
|    | over 50,000 | 4 | | |
| V2 | 0–10,000 | 0 | 0–10,000 | 0 |
|    | 10,000–20,000 | 2 | 10,000–30,000 | 1 |
|    | 20,000–50,000 | 3 | over 30,000 | 2 |
|    | 50,000–150,000 | 4 | | |
|    | over 150,000 | 5 | | |
| V3 | 0–5,000 | 1 | 0–15,000 | 0 |
|    | 5,000–30,000 | 2 | over 15,000 | 2 |
|    | 30,000–100,000 | 3 | | |
|    | over 100,000 | 4 | | |

For instance, V2 gives the company a 2% discount on all products purchased on a commitment basis if the total dollar amount of all commitment purchases from V2 is at least $10,000 but less than $20,000. Accordingly, if the company commits to buy $10,000 worth of products from V2, then the actual price paid by the company is $9,800. Thus, the company has obtained a $200 discount on the products purchased from V2. On the other hand, if the company only buys $9,900 worth of products on a commitment basis from V2, then no discount is given and the actual price paid remains $9,900.

This example points out some interesting features of the business volume discount type of purchasing strategy. First of all, the company is able to take full advantage of its purchasing power by obtaining discounts based on the total dollar amount of business rather than the quantity of a particular product purchased. Secondly, the company can actually save money by buying more. In the example, the company saved $100 by buying an extra $200 worth of products. For this reason, it is not always advantageous to buy a product from the vendor offering that product for the lowest price.

Rather, it may be better to purchase a product from a nominally more expensive vendor in order to move into a higher discount bracket for that vendor.

To understand why an optimizing system is needed for analyzing this type of problem, it is instructive to consider the following situation. It is supposed that the company has decided that it desires to buy 80% of the forecasted demand for each product on a commitment basis, and that it does not want to purchase more than 60% of the demand for each product from a single supplier. To fulfill these desires (i.e., requirements) a company may proceed as follows for any product: buy 60% of the forecasted demand from the vendor with the lowest commitment base price for that product, buy an additional 20% (i.e., 80%–60%) from the vendor with the next lowest commitment base price, and then buy the remaining 20% of the forecasted demand from the vendor with the lowest as-ordered base price among those vendors beside the one from which the first 60% was purchased. This approach results in the purchasing schedule shown in TABLE 4.

TABLE 4

| Vendor | Product | Quantity Purchased | |
|---|---|---|---|
| | | Commitment | As-Ordered |
| V1 | P1 | 0 | 0 |
| | P2 | 75 | 75 |
| | P3 | 187 | 0 |
| V2 | P1 | 100 | 100 |
| | P2 | 225 | 0 |
| | P3 | 0 | 63 |
| V3 | P1 | 300 | 0 |
| | P2 | 0 | 0 |
| | P3 | 63 | 0 |

In other words, the company buys 100 units (0.20×500) of P1 from V2 on a commitment basis, 300 units (0.60×500) from V3 on a commitment basis, 100 units (0.20×500) from V2 on an as-ordered basis, and so forth. The nominal cost of this purchasing strategy is $150,380. However, if discounts are figured in the total net cost (the cost after discounts have been accounted for) is $147,116.

The purchasing schedule of TABLE 5 is now considered to illustrate the power of the automated system in accordance with the present invention under the business volume discount regime.

TABLE 5

| Vendor | Product | Quantity Purchased | |
|---|---|---|---|
| | | Commitment | As-Ordered |
| V1 | P1 | 12 | 0 |
| | P2 | 180 | 45 |
| | P3 | 151 | 38 |
| V2 | P1 | 148 | 40 |
| | P2 | 120 | 30 |
| | P3 | 0 | 0 |
| V3 | P1 | 240 | 60 |
| | P2 | 0 | 0 |
| | P3 | 100 | 24 |

The results of TABLE 5 also satisfy the conditions that 80% of the forecasted demand be purchased on a commitment basis and that no more than 60% of the forecasted demand be bought from a single vendor. The nominal total net cost of this purchasing schedule is $148,684. The total cost including discounts is $144,586, a savings of $2,530 over the discounted total cost of TABLE 4 obtained by selecting vendors based on the lowest quoted base price for each product.

It is not a straightforward matter to determine that the schedule of TABLE 5 is better than the one of TABLE 4. In fact, however, the purchasing schedule of TABLE 5 is the optimal one, that is, the best solution of the business volume discount model with the given constraints.

Details of the Present Invention

With reference of FIG. 1, there is shown a high-level block diagram of components comprising computer-based automated system 100. In particular, system 100 includes: central processing unit (CPU) 150; memory 120; display device 110; and product price and discount price databases 130 and 140, respectively. The user of system 100, as depicted by dashed block 90, inputs data to the system and receives responses from the system via display device 110. For example, to populate product price database 130, the user calls into view on display device 110 a screen layout essentially as depicted by TABLE 2 having the header information (VENDOR, PRODUCT, Commitment Price ($), As-ordered ($)) but blank columns for price, vendor and product information. The user then inputs the information and the entered information is then stored in database 130 for later recall. Similarly, database 140 is populated by calling into view a screen layout essentially as depicted by TABLE 3 having the header information but blank columns. The user then inputs the information and it is stored in database 140 for later recall. The user also utilizes display device 110 to provide input relating to the product demands, such as depicted by TABLE 1. This information may be stored in memory 120 at memory location 121. Also, an appropriately arranged screen layout can be called into view on display device 110 to provide information for system 100 regarding constraints on the product purchases, such as the percentage of product demands to be purchased on a commitment basis and as-ordered basis, the maximum percentage of product demands to be purchased from any given vendor, and so forth; this latter information can also be stored in memory 120 at memory location 122.

Memory 120 typically also contains the business volume discount algorithm, at location 123, which may then be invoked by the user to process, in CPU 150, the product requirements stored in location 121, while utilizing the constraints in location 122 and the data in databases 130 and 140. The results of the processing are then stored in memory 120 at location 124 and the results are also displayed on device 110 to impart the purchasing strategy to user 90.

It is to be understood that the block diagram of FIG. 1 is merely illustrative of one embodiment of the present invention. One skilled in the art will immediately realize that if computer system 100 is implemented on a personal computer, then memory 120 and databases 130 and 140 may be implemented by a single hard disk.

Figure 2:
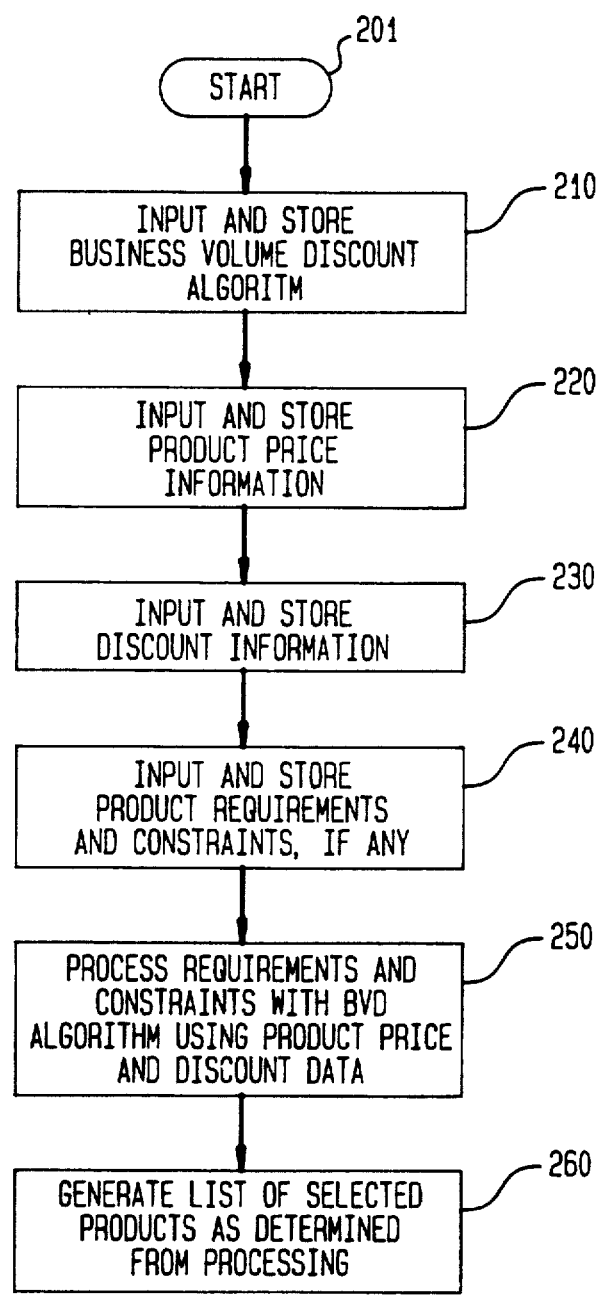
FIG. 2 is a flow diagram of the steps for determining the optimal purchasing solution.

With reference to FIG. 2 there is shown flow diagram 200 of the processing effected in accordance with the present invention. After initialization of the process, as depicted by block 201, the business volume discount algorithm is entered into system 100 and stored in memory 120. The next two processing blocks, namely, blocks 220 and 230, depict the inputting and storing of the product price information and the discount information, respectively. Block 240 is then invoked to prompt the user to input the product requirements and constraints, if any. With all the required information now available in storage, processing block 250 is now invoked to determine the optimal purchasing strategy for the required products in view of the constraints, if any, and the information in the product price and discount databases. Finally, processing block 260 is entered so as to generate and display upon request by the user a list of selected products as determined from the optimal solution to the business volume discount model in view of the present information and constraints.

Optimization Algorithm

The basis of the optimization algorithm is one of making comparisons and eliminating purchasing options which are not financially attractive without actually calculating the cost of these non-optimal options.

Figure 3:
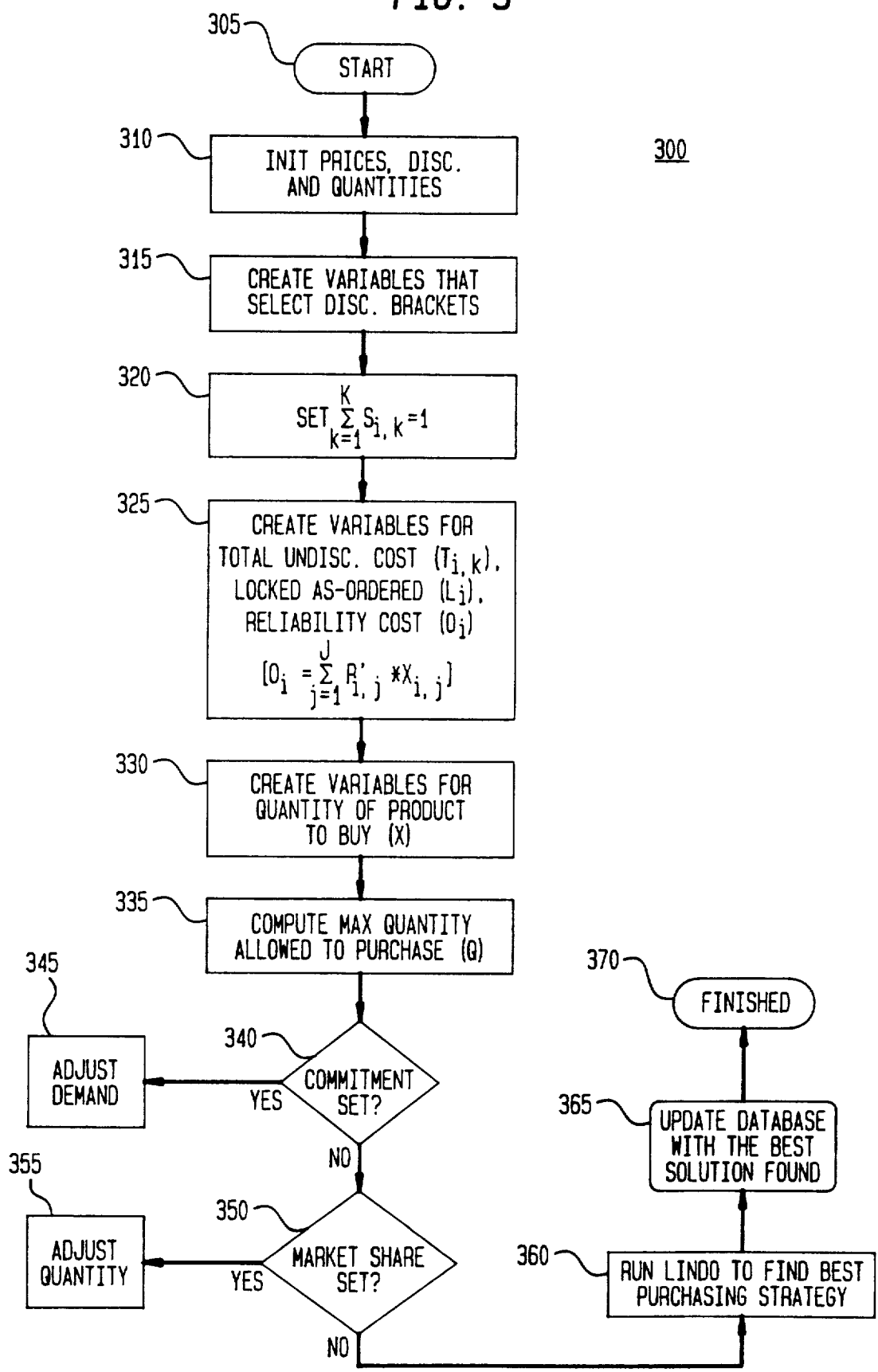
FIG. 3 is a flow diagram of the processing effected by the business volume discount algorithm applied to input data so as to generate the report of selected products.

With reference to FIG. 3, there is shown block diagram 300 of the processing effected by processing block 250 of FIG. 2, that is, the minimization of a cost function for the business volume discount regime using a linear programming technique. FIG. 3 represents a general methodology which in implementation is used twice, back to back. Initially, it is used to optimize the commitment purchases. Next, it is used to optimize the remaining purchases, on as-ordered basis, necessary to fulfill each product demand. The description of FIG. 3 will be interwoven with the data supplied by TABLES 1-3 to illustrate how the report of selected products represented by the contents of TABLE 5 were generated. In particular, vendor V1 will be tracked through the description of block diagram 300.

In processing block 310, paramenters and variables are initialized with essential data. The input of the forecasted demand (TABLE 1), commitment and standard as-ordered base price quotes (TABLE 2), and business volume discounts (TABLE 3) are entered and stored in the appropriate databases of computer system 100. Thus, for instance, the initialization includes: the demand for product P1 (e.g., $D_1 = 500$); the commitment price for vendor V1, product P1 (e.g., $110), and the quantity of product P1 from vendor V1 is set to 0 (e.g., $X_{1,1} = 0$).

Processing of block 315 is then invoked to select variables to be associated with discount brackets—the so-called discount indicators. These indicators are boolean (i.e., take on only the values 0 and 1), with 0 indicating that a discount bracket for a particular vendor is not selected, and a 1 indicating that it is selected. For instance, vendor V1 has 3 discount brackets: (1) 0–$5,000; (2) $5,000–$50,000; and (3) $50,000 and over. Accordingly, the variables $S_{1,1}$ and $S_{1,2}$ and $S_{1,3}$ are created.

In order to force at most one discount bracket to be selected, the discount indicators are summed by processing block 320. For example, vendor V1 would produce the following constraint: $S_{1,1} + S_{1,2} + S_{1,3} = 1$. Since the variables are only 0 or 1, this forces exactly one of them to take the value 1, thus yielding the best discount bracket to choose for vendor V1.

The processing effected by block 325 is then invoked. The variables of total undiscounted cost for a vendor, locked-as-ordered and other life cycles costs are created by this processing. There are as many total cost variables as there are discount brackets. The value produced is the total undiscounted cost of purchases from the indicated supplier. Locked-as-ordered purchases again refer to those products that have already been purchased on a commitment basis. The as-ordered price received is locked in the sense that such a price does not contribute to the as-ordered total for discounts since the purchase price is locked at the commitment price. If no commitment price has taken place, however, then the standard as-ordered prices and discount schedules are in effect. In tracking vendor V1, from TABLE 5, it is seen that V1 has a total undiscounted cost of $50,100 (i.e., $12 \times \$110 + 180 \times \$120 + 151 \times \$180$) by simply multiplying quantity times base price and adding up the results. Such a calculation puts V1 in the third discount bracket, so $T_{1,3} = 50,100$. The total locked-as-ordered purchases for V1 will become $L_1 = 45 \times \$115.20 + 38 \times \$172.80 = \$11,750$. The unit prices are the commitment discount prices (i.e., 4% off the $120 and $180 unit prices) for products P2 and P3 of V1, respectively. The constraints to evaluate these and tie them to quantity purchased and discount indicators are created in block 325.

Block 330 is invoked to create the variables that will tell how many of what product from what vendor will be purchased as an outcome of the optimal solution. In TABLE 5, under the Commitment column, 151 units of P3 are purchased from V1. Therefore, $X_{1,3} = 151$. It is noted that the variables are created here, but not solved yet (e.g., the value of $X_{1,3}$ at this point is (0).

The combined processing of blocks 335,340,345 is effected to determine the quantity to purchase for each product. In the example, the commitment percentage is 80%. This means that the purchaser commits to no more than 80% of the forecasted demand. The demand for P1 is 500; therefore, no more than $80\% \times 500 = 400$ items are to be purchased on a commitment basis. A constraint of the form $X_{1,1} + X_{2,1} + X_{3,1} = 400$ is generated here to satisfy this commitment limit.

Next, the processing of blocks 350,355 is invoked to determine the maximum amount per vendor to be purchased for each product. Since the market share is 60%, this means that no more than 60% of the products should be purchased from any one vendor. For V1, P1, that demand is 400. Therefore, no more than $60\% \times 400 = 240$ of P1 may be purchased from V1. Thus, a constraint of $X_{1,1} \leq 240$ is generated by these blocks.

Upon entering processing block 360, a so-called cost function has been generated; this function is representative of the business volume discount regime. Minimization of this cost function subject to the constraints results in the optimal solution to the procurement problem. Page 1 of the Appendix lists a representation, namely, equation (1), of the cost function of the business volume discount model to be solved by a linear programming technique for commitment purchases. Also shown in the Appendix are the constraints for which equation (1) is subject to during the minimization process.

One exemplary linear program technique for minimizing equation (1) is known as LINDO by those with skill in the art. A representative reference for LINDO is *User's Manual for Linear, Integer and Quadratic Programming with LINDO*, by Linus Schrage, published by the Scientific Press, Palo Alto, 1989 (Fifth Edition).

The values of the quantities (e.g., $X_{i,j}$) purchased as determined from processing the cost function by the linear programming are returned and stored as data in computer system 100. The concomitant cost information and the discount levels are then computed and the results are formatted and displayed on display device 110 in a form summarized by TABLE 5.

Processing then terminates, as represented by block 370.

It is to be further understood that the methodology and concomitant circuitry described herein is not limited to the specific forms shown by way of illustration, but may assume other embodiments limited only by the scope of the appended claims.

APPENDIX

Minimize $\sum_{i=1}^{I} \sum_{k=1}^{K} (1 - d_{ik}) T_{ik} + \sum_{i=1}^{I} \sum_{j=1}^{J} P'_{ij} X_{ij}$  (1)

Subject To:

$\sum_{i \in I_j^1} X_{ij} = C_j D_j$ for every $j$ $X_{ij} \leq M_j C_j D_j$ for every $i$ and $j$ $X_{ij} \leq Q_{ij}$ for every $i \in I_j^2$ and $j$ $\sum_{k=1}^{K} T_{ik} \leq U_i$ for every $i \in I_j^3$ $\sum_{j=1}^{J} P_{ij} X_{ij} - \sum_{k=1}^{K} T_{ik} = 0$ for every $i$ $T_{ik} - U_{ik} S_{ik} \leq 0$ for every $i$ and $k$ $T_{i(k-1)} - U_{ik} S_{i(k-1)} \geq 0$ for every $i$ and $k$ except $k = K$ $\sum_{k=1}^{K} S_{ik} = 1$ for every $i$ $X_{ij}, T_{ik} \geq 0$ for every $i, j,$ and $k$ $S_{ik} = [0,1]$ for every $i,$ and $k$ $d_{ik}$ = Discount coefficient associated with the segment $k$ of the supplier $i$'s cost function
$i = 1, 2, \ldots, I$ approved suppliers
$j = 1, 2, \ldots, J$ products
$k = 1, 2, \ldots, K$ segments of the sawtooth function
$C_j$ = Commitment percentage for product $j$
$D_j$ = Demand forecast for product $j$
$I_j^1$ = Set of suppliers offering product $j$
$I_j^2$ = Set of suppliers with capacity limit for product $j$
$I_j^3$ = Set of suppliers with an upper bound limit for the business volume awarded
$M_j$ = Market share percentage for product $j$
$P_{ij}$ = Base price of product $j$ if purchased from supplier $i$
$P'_{ij}$ = "Other costs" for every unit of product $j$ purchased from supplier $i$
$Q_{ij}$ = Maximum quantity of product $j$ which may be purchased from supplier $i$ due to capacity or other considerations
$S_{ik}$ = Boolean variable indicating which segment of the supplier $i$'s cost function contains the dollar amount of business awarded to this supplier
$T_{ik}$ = Business volume awarded to supplier $i$ falling on segment $k$ of the supplier $i$'s cost function
$U_{ik}$ = Upper cut-off point of the $k$th discount bracket of supplier $i$
$U_i$ = Upper bound limit for the dollar volume of business awarded to supplier $i$
$X_{ij}$ = Quantity of product $j$ purchased from supplier $i$
$L_i$ = Total locked-as-ordered cost due to purchases made from supplier $i$
$O_i$ = Total other cost such as reliability cost due to purchases made from supplier $i$ $S_{ik} = \begin{cases} 1 & \text{if the value of purchases fall on segment } k \text{ of the supplier } i\text{'s cost function} \\ 0 & \text{if the value of purchases does not on segment } k \text{ of the supplier } i\text{'s cost function} \end{cases}$ -continued
APPENDIX $T_{ik} = \begin{cases} >0 & \text{if the value of purchases made from supplier } i \text{ falls on segment } k \text{ of its cost function} \\ 0 & \text{if the value of purchases made from supplier } i \text{ does not fall on segment } k \text{ of its cost function or if nothing is purchased from supplier } i \end{cases}$

What is claimed is:

1. An automated method implemented on a computer system for generating product procurement requests by a purchaser under a business volume discount regime, the method comprising the steps of
   entering and storing in a product-price database of the computer system data representative of the costs of individual products supplied by vendors, the cost including commitment prices and as-ordered prices,
   entering and storing in a discount database of the computer system data representative of the discounts applied to the products by each of the vendors on a commitment basis and an as-ordered basis,
   inputting into the computer system by the purchaser a set of product requirements,
   applying a prescribed mathematical algorithm, as implemented by a computer program stored in the computer system, to said set of product requirements, said algorithm including a mathematical relationship representative of a business volume decision purchasing model which utilizes said product-price database and said discount database, and
   displaying on the computer system a list of selected ones of the products and costs along with associated vendors as determined from applying said mathematical algorithm.

2. The method as recited in claim 1 wherein said step of applying said prescribed algorithm includes the steps of
   determining a cost function, including constraints, representative of the business volume discount regime and indicative of said mathematical relationship, and
   minimizing said cost function with a linear programming solution technique.

3. An automated method implemented on a computer system for generating product procurement requests by a purchaser under a business volume discount regime, the method comprising the steps of
   providing an input data screen to input product price data and discount price data by a user and storing said product price data and said discount price data in the computer system,
   providing an input screen to input product requirements as stipulated by the user,
   calculating an optimal purchasing strategy for the product requirements based on a business volume discount model utilizing said product price data and said discount price data, and
   printing by the computer system a purchasing list as determined from the optimal purchasing strategy.

4. The method as recited in claim 3 further including the step of
   displaying on the computer system said purchasing list.

5. The method as recited in claim 4 wherein said step of calculating includes the steps of
   determining a cost function, including constraints, representative of the business volume discount regime, and
   minimizing said cost function with a linear programming solution technique to obtain said optimal purchasing strategy.

6. An automated process implemented on a digital computer for producing a product procurement list from a product requirements list, the process comprising the steps of
   prompting a user to input data into the digital computer relating to product price and discounts for each vendor of the products,
   capturing product price and discount data as supplied by the user to the digital computer,
   processing said product price data and said discount data with an algorithm defining a business volume discount model to generate an optimal purchasing strategy, and
   producing by the digital computer a product purchase list based on the results of the processing step.

7. The method as recited in claim 6 further including the step of
   displaying said product purchase list on the digital computer.

8. The process as recited in claim 7 where in said step of processing includes the steps of
   determining a cost function, including constraints, representative of the business volume discount model, and
   minimizing said cost function with a linear programming solution technique to obtain said optimal purchasing strategy.

9. A procurement processing system comprising
   storing means for storing product price information and for storing product discount information,
   input means for inputting product demands,
   means for determining the optimal purchasing strategy for purchasing products under a business volume discount regime utilizing said product price information and said product discount information, and
   output means for outputting a list of selected products based on the said optimal purchasing strategy as generated by said means for determining.

* * * * *